United States Patent Office 3,669,751
Patented June 13, 1972

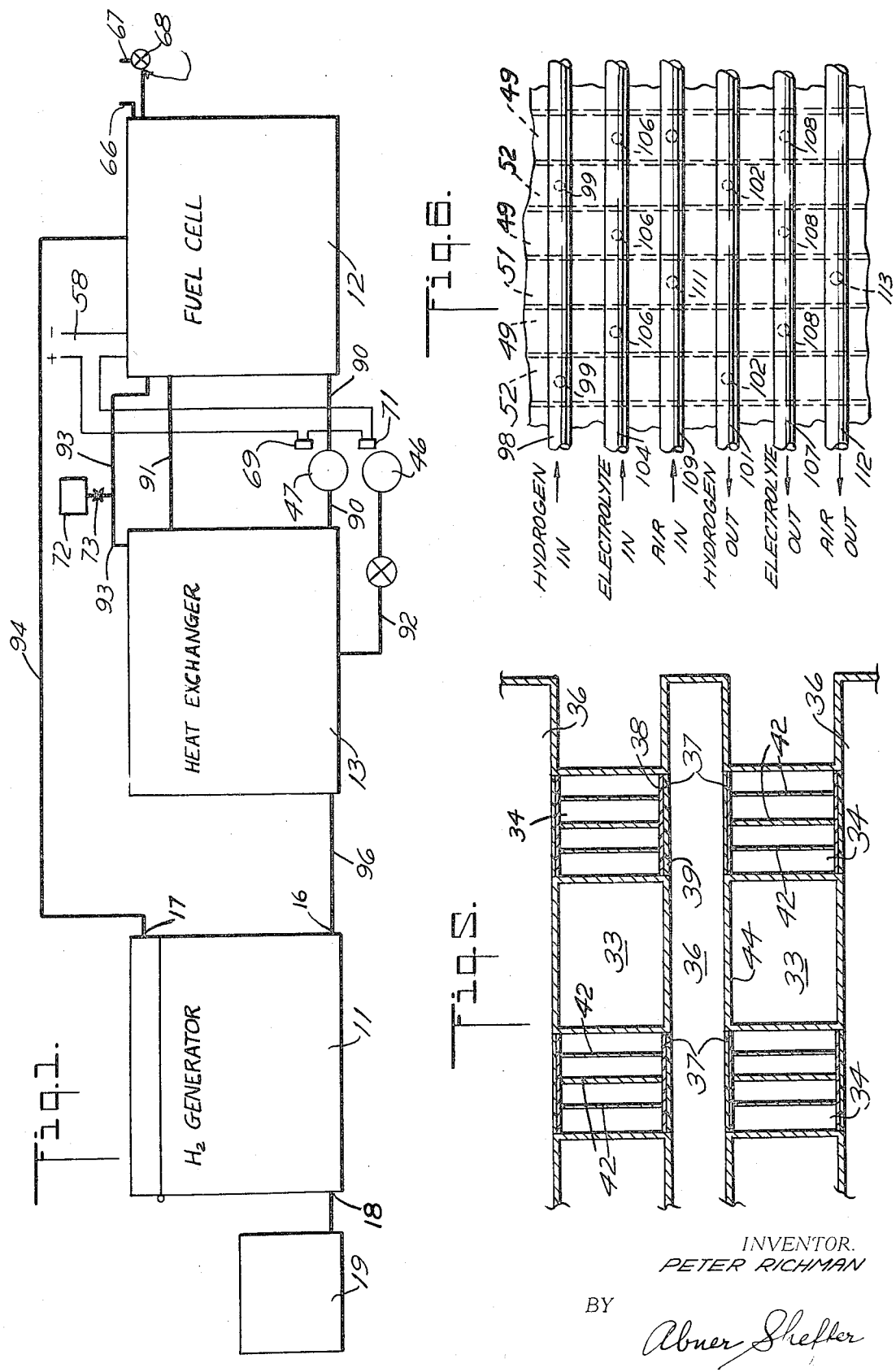

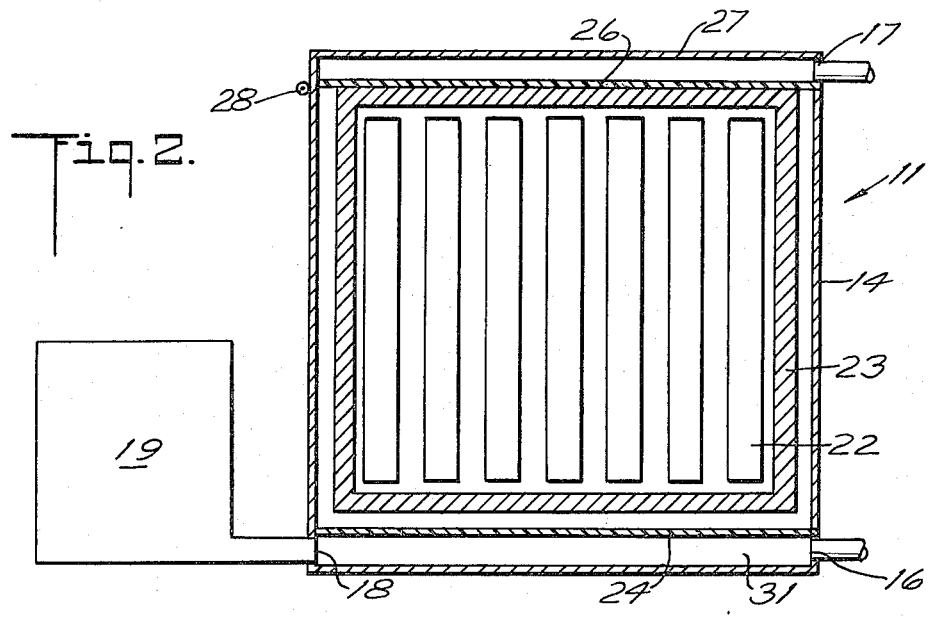
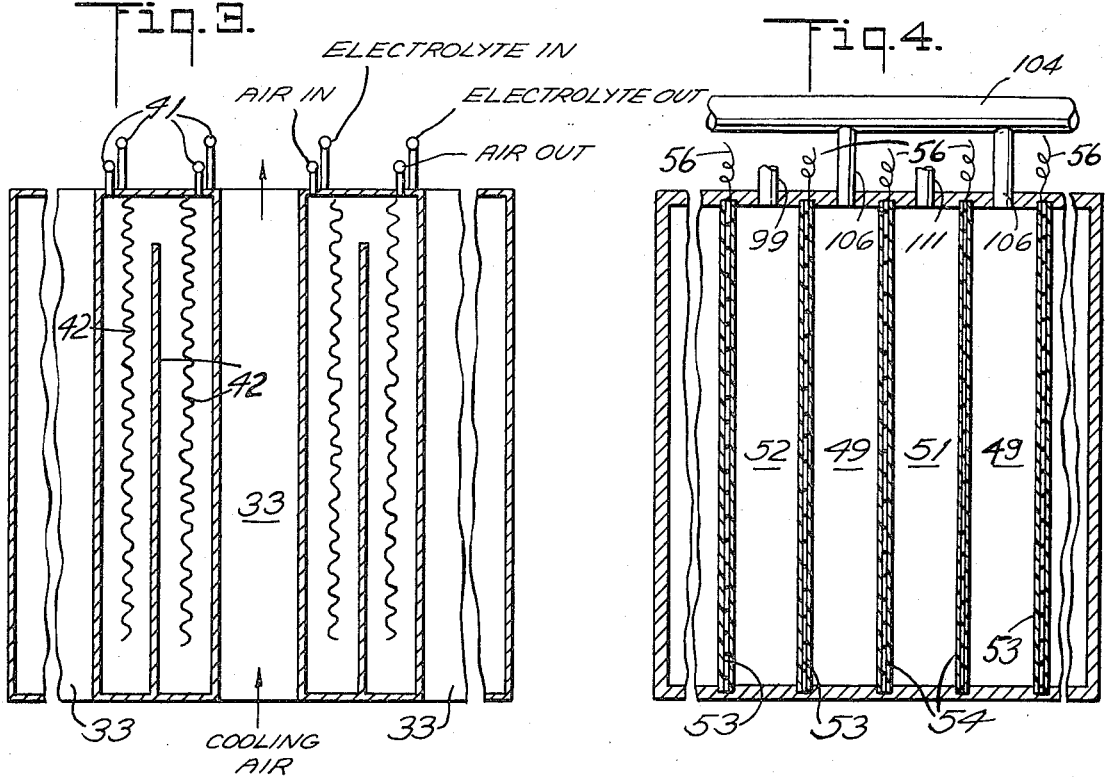
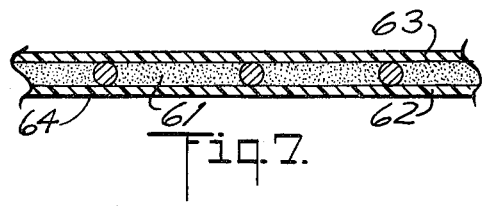
INVENTOR.
PETER RICHMAN

3,669,751
ELECTRIC BATTERY COMPRISING A FUEL CELL HYDROGEN GENERATOR AND HEAT EXCHANGER
Peter D. Richman, 164 Leach Ave., Park Ridge, N.J. 07656
Filed Mar. 15, 1967, Ser. No. 623,465
Int. Cl. H01m 27/14
U.S. Cl. 136—86 C
22 Claims

ABSTRACT OF THE DISCLOSURE

An electric battery of very high capacity per pound. The preferred embodiment is a self-balancing system having a hydrogen-oxygen fuel cell, a circulating KOH electrolyte and a hydrogen generator in which an Si-Al mixture is reacted with the electrolyte to produce hydrogen and an insoluble aluminum silicate, thus taking up the water generated in the fuel cell. In the fuel cell the electrodes preferably have a hydrophobic surface on the gas side and a hydrophilic bubble barrier on the electrolyte side.

---

This invention relates to electric batteries and to fuel cells.

Even the best of the newly developed electric batteries arie quite heavy in relation to their electrical output. See, for example, the recent article by Hoffman on "The Electric Automobile" in Scientific American, October 1966, pp. 34–40, where it is stated that "even the very costly silver-zinc batteries developed for the electrical systems of space vehicles are good for 30 watt-hours per pound," and where the author predicts that "before long . . . development will produce metal-air batteries with an energy density of 60 watt-hours per pound or even higher."

Batteries made by combining a fuel cell with stored hydrogen have also been suggested in the art and, in fact, a fuel cell supplied with hydrogen has been employed in the flights of the Gemini space capsule (see "Proceedings 20th Annual Power Sources Conference," articles by R. Cohn on "Gemini Fuel Cell System." This system too gives a relatively low output per pound.

Combinations of fuel cells and hydrogen generators, such as steam reformers for converting hydrocarbons to hydrogen, have been designed, as reported, for example, by Kirkland in an article at pages 35–38 of "Proceedings 20th Annual Power Sources Conference." Such systems are quite complex and also give a relatively low electrical output per pound.

According to one aspect of the present invention, I have developed a fuel cell battery system which has the capability of delivering a high electrical output. Furthermore this battery system can be quickly, easily and simply refueled at a fuel cost comparable to the prices paid by consumers for electricity obtained from a central power station. The fuel used is inexpensive, plentiful, lightweight and easily and safely handled. The capital costs of my battery system are also very much lower, for similar power and capacity, than those of the prior art.

My invention makes it possible to construct battery systems of very high capacity per pound which are capable of starting readily at an ambient temperature as low as −20° F. or less and even after being held inactive, in standby condition, for long periods; which are capable of operating efficiently and continuously over a very wide range of discharge rates; and which have a very long life. The systems are essentially self-regulating and use a minimum of external controls, in contrast to existing fuel cells which require the maintenance of delicate and precise heat and water balances, with external controls to prevent flooding or drying out of the electrodes.

One embodiment of the invention is illustrated in the accompanying drawings, which are largely schematic and in which:

FIG. 1 is an overall side view of the battery system;
FIG. 2 is a cross-sectional side view of a hydrogen generator and reservoir;
FIG. 3 is a side view, mainly in cross-section, of a heat exchanger;
FIG. 4 is a plan view, mainly in cross-section, of a fuel cell;
FIG. 5 is a cross-sectional plan view of a typical portion of the heat exchanger;
FIG. 6 is a plan view of a portion of a fuel cell, illustrating a manifold arrangement; and
FIG. 7 is a cross-sectional view of an electrode used in the fuel cell.

The battery illustrated in the drawing has two principal units, a hydrogen generator 11 and a fuel cell 12 where the hydrogen from the generator is used to produce electricity by reaction with oxygen. The electrolyte used in the fuel cell is also present in the hydrogen generator, where it takes part in a hydrogen-producing reaction, and where its water content is diminished, thus consuming the water produced by the hydrogen-oxygen reaction of the fuel cell.

For many purposes, and particularly when the fuel cell is to be run at high rates, the battery includes, as a third principal unit, a heat exchanger 13 through which electrolyte circulates for the removal of excess heat generated by the reaction in the fuel cell. The heat exchanger may also serve to treat the incoming air in a desirable manner before it is admitted to the fuel cell by saturating this air with moisture, preheating it and removing carbon dioxide therefrom; these functions are performed by bringing the incoming air into reactive and evaporative contact with the electrolyte removed from the fuel cell.

In the preferred embodiment of the invention, the electrolyte is an aqueous solution of a base, preferably potassium hydroxide, and the material used to react therewith to produce the hydrogen is a mixture of silicon and aluminum. I have found that this mixture reacts with the aqueous KOH to produce an insoluble potassium aluminum silicate; for example, according to the following equation:

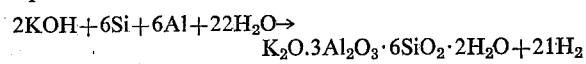

$$2KOH + 6Si + 6Al + 22H_2O \rightarrow K_2O \cdot 3Al_2O_3 \cdot 6SiO_2 \cdot 2H_2O + 21H_2$$

This reaction product is insoluble in the electrolyte and does not contaminate it, so that the electrolyte can be recirculated to the fuel cell after the reaction without an adverse effect on the operation of the fuel cell. It will be seen from the above equation that the same reaction also consumes a considerable amount of water, thus raising the KOH concentration in a desirable manner.

The aqueous KOH also serves, in one embodiment, to remove undesired $CO_2$ from the incoming air in the heat exchanger, according to the reaction:

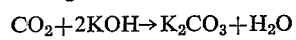

$$CO_2 + 2KOH \rightarrow K_2CO_3 + H_2O$$

In the preferred embodiment the hydrogen generator is constructed to operate, automatically, in a pulsating manner so that there is a repeated variation in the pressure of hydrogen fed to the fuel cell. The pulsations aid in the operation of the fuel cell.

Turning now to the details of the illustrated hydrogen generator 11, it comprises an imperforate outer casing 14 (FIG. 2) having an opening 16 for passage of the electrolyte, an outlet 17 for the hydrogen and an inlet 18 for receiving additional electrolyte (as from a reservoir 19). Solid hydrogen-producing units 22 (preferably of an Al-Si mixture, as previously described) are situated within the outer casing 14, preferably being mounted in spaced relationship on a suitable support such as a rack or a basket or permeable container 23; thus, when the units 22 have been spent they may be removed with their support, as a single package, from the outer casing 14 and a replacement package, comprising an identical support carrying a plurality of fresh units 22, may be inserted, thereby recharging the battery.

Between the electrolyte passage 16 and the units 22 there is a porous bubble barrier 24 which helps to prevent the generated hydrogen from backing up into the electrolyte below the barrier. Above the units 22 there is a hydrophobic filter 26 which permits the passage of hydrogen gas but blocks the passage of electrolyte and any solids that may be dispersed therein, thus preventing the hydrogen from being contaminated by foam or spray resulting from the hydrogen-producing reaction. This filter 26 may be supported on the cover 27 of the outer casing 14, which cover may be hinged, as at 28, so that it can be swung upwards to permit the removal and replacement of the hydrogen-producing units 22.

The units 22 are preferably porous and not very thick; they may be circular cylindrical rods about 2 cm. in diameter made by compacting a mixture of finely divided particles of silicon and aluminum. Their porosity and limited thickness permits the aqueous electrolyte to penetrate to the center of the rods without being blocked by the gelatinous potassium aluminum silicate reaction product. The porosity of the rods provides space for the reaction product while the rod maintains its coherent nature, and its shape and form; thus when the reactive material of the rods is used up, the spent rods can be readily removed, for replacement. The chemical components of the rods need not be in the pure state; for example, commercial ferrosilicon containing about 92% silicon and 7½% iron has been used with good results; the presence of the iron has produced no adverse effects on the reaction.

Aside from the fact that it forms an insoluble reaction product which does not contaminate the electrolyte and which includes substantially all of the water produced in the fuel cell, the aluminum-silicon combination has other advantages. It is extremely light in weight. Unlike a unit made solely of silicon, it is practically immediately reactive with the electrolyte; I believe that the aluminum begins reacting almost at once and the rise in temperature, resulting from the exothermic heat of reaction, increases the reactivity of the silicon. Also the use of the aluminum-silicon combination avoids the retardation of the reaction which occurs (probably due to the presence of dissolved silicon in the aqueous medium) when silicon alone is used. The presence of iron, as in ferrosilicon, also promotes the hydrogen-producing reaction. The reaction of the Al-Si mixture with the electrolyte removes from the electrolyte an amount of water just about equivalent to the amount of hydrogen generated by that reaction, making the system substantially self-balancing with respect to water; if aluminum alone is used, the reaction consumes a greater amount of water, and a relatively large amount of water must therefore be continuously added to the system. The formation of the gelatinous reaction product will also tend to have a desirable effect in purifying the electrolyte by trapping impurities in its lattice structure.

The illustrated construction automatically balances the operation of the hydrogen generator in accordance with the hydrogen utilization in the fuel cell, which is in turn governed by the electrical load on the battery. As the pressure of hydrogen builds up the gas pushes the electrolyte downward, thus reducing the area of contact between the electrolyte and the units 22 and thereby decreases the rate of generation of hydrogen. The increase in pressure can drive the electrolyte level below the units and stop the reaction entirely. The use of hydrogen by the fuel cell causes the pressure in the generator 11 to drop, permitting the electrolyte level therein to rise and start the reaction again. The presence of the bubble barrier 24 prevents the intrusion of the hydrogen gas into the space 31 beneath it. Bubble barriers of known construction, made of material resistant to the electrolyte (e.g. polytetrafluoroethylene, polyvinyl chloride, Kynar [polyvinylidene fluoride] or Penton [poly-$OC(Cl_2)$—]) and having controlled pore sizes, may be employed. One suitable bubble barrier has a pore size of 6 microns and is capable of withstanding a "bubble pressure" of about 5 p.s.i.; that is, the first gas bubble will pass through the barrier when the pressure difference between the gas (on one side of the barrier and at the higher pressure) and the liquid (on the other side of the barrier) reaches about 5 p.s.i. or higher.

The hydrophobic filter 26 preferably has a surface of a hydrophobic polymer resistant to degradation by the electrolyte, such as polytetrafluoroethylene or similar material of high fluorine content. Filters of this nature are commercially available.

The electrolyte reservoir 19 may be connected to the hydrogen generator 11 by means of the free passageway 18 so that the electrolyte is supplied to the generator from the reservoir automatically, as by gravity feed, as needed (or any excess electrolyte is taken up in the reservoir). It will be understood that, instead of using a separate electrolyte reservoir 19, reserve space for electrolyte may be provided within the housing 14 of the hydrogen generator 11.

In the illustrated embodiment the passage 16 serves not only as an inlet through which the water-diluted electrolyte (carrying water picked up by it in the fuel cell) enters the hydrogen generator 11, but also as an outlet for the passage of the electrolyte of lower water content out of the hydrogen generator. Thus, with respect to the electrolyte in the fuel cell 12 and heat exchanger 13, the hydrogen generator constitutes a sort of bay, there being little or no current of liquid in the passage 16; much of the transport of material occurs by diffusion, with the KOH diffusing (owing to the concentration gradient) out of the hydrogen generator 11. It is of course within the scope of the invention to provide means for positively circulating the electrolyte into and out of the hydrogen generator.

In the illustrated heat exchanger 13 (see FIGS. 3 and 5) the hot electrolyte from the fuel cell 12 flows in a serpentine path and is brought into evaporative and scrubbing contact with the reactant air (i.e. the air to be supplied to the fuel cell). At the same time, additional air is passed through the heat exchanger, out of contact with the electrolyte, to remove heat by convection. As shown in FIGS. 3 and 5, there are a series of vertical cooling air passages 33 (which may be rectangular, e.g. square, in cross-section), a series of vertical reactant air passages 34, and another series of vertical electrolyte passages 36, the electrolyte passages 36 being separated from the reactant air passages 34 by special porous barriers 37 which block the movement of the electrolyte therethrough but permit the transport of gases such as air and water vapor. These barriers 37 may be made of a composite structure comprising a gas-permeable hydrophobic layer 38 which prevents passage of the electrolyte into the gas space 34 and a hydrophilic layer 39 which is permeable to, and wet by, the aqueous electrolyte but whose pores are so small that, when so wetted, they resist penetration of the gas into the electrolyte space 36. In passing along the barriers 37 the reactant air is heated almost to the temperature of the entering electrolyte, becomes substantially saturated with moisture at that elevated temperature, and loses substantially all its $CO_2$ content by reaction thereof with the electrolyte forming $K_2CO_3$, as indicated previously, which may be deposited in or along the barriers 37. By means of suitable manifolding (indicated schematically as 41) and baffles indicated schematically as 42), the reactant air (and electrolyte if desired) are made to follow serpentine countercurrent paths so that the reactant air just about to be fed to the fuel cell is brought into the evaporative contact with the hot electrolyte just leaving the fuel cell. The elevated temperature also assists the reaction of the carbon dioxide and the electrolyte.

The walls 44 bounding the cooling air passages 33 are made of suitable heat-conductive material, such as nickel or nickel-plated magnesium, to facilitate heat transfer from the electrolyte through these walls.

In the fuel cell 12 (see FIGS. 1 and 4), there are brought together the preheated, saturated, scrubbed reactant air from the heat exchanger, the electrolyte from the heat exchanger, and the hydrogen from the hydrogen generator. A blower 46 serves to force the reactant air through the heat exchanger 13 and into the fuel cell, while the cooled electrolyte from the heat exchanger is delivered to the same fuel cell by a pump 47. The pump also serves to maintain the electrolyte in the fuel cell 12, the heat exchanger 13 and the hydrogen generator 11 under a positive superatmospheric pressure.

In the illustrated embodiment, the electrolyte, air and hydrogen in the fuel cell pass through parallel thin chambers 49 (FIG. 4), 51, 52, being separated from each other by the electrodes 53 and 54. Each electrolyte chamber 49 is situated between an air chamber 51 and a hydrogen chamber 52. The electrode 53 which acts as the anode serves as the boundary between the hydrogen and electrolyte chambers (52, 49), while the electrode 54 which acts as the cathode constitutes the boundary between the air and electrolyte chambers. The electrodes are connected through suitable electrical conductors 56 to the battery terminals 58 in well-known manner.

In one preferred form of the invention, both electrodes are made up of a thin bed of catalyst 61 (FIG. 7) supported in electrically conductive contact with a current collector, which may be a screen such as a wire mesh 62 between a porous hydrophobic layer 63 (on the gas side of the electrode) and a porous hydrophilic layer 64 (on the electrolyte side of the electrode). The hydrophobic layer 63 permits the gas to pass therethrough into contact with the catalyst bed 61 which is wet with the electrolyte, but blocks any flow of electrolyte, or of water of reaction, from the catalyst bed to the gas chamber 51 or 52 and thereby reduces flooding of the gas chambers. The hydrophilic layer 64, on the other hand, is permeable to the electrolyte and thus keeps the catalyst bed wet with electrolyte (in effect, drawing the electrolyte into contact with the bed by capillary action), but is impermeable to the gas, preventing the gas from bubbling into the electrolyte chamber 49. The catalyst bed 61 itself is preferably very thin, having a thickness of less than about 0.02 inch (e.g. 0.004 inch), and the overall thickness of the electrodes is not much greater (e.g. 0.008 inch).

The fuel cell 12 has an air vent 66 and also has a hydrogen vent 67, controlled by a valve 68, for the periodic, controlled discharge of any inert contaminating gases in the fuel cell, as is well known in the art. The hydrogen vent valve 68 may be a pressure-responsive valve preset at a level predetermined by the operation of the hydrogen generator so as to permit discharge of hydrogen through valve 68 only when the pressure in the fuel cell approaches the predetermined peak of the pressure generated by the hydrogen generator, or only when the hydrogen pressure approaches or exceeds the "bubble pressure" value of the bubble barrier 24 of the hydrogen generator.

The air blower 46 and electrolyte pump 47 are electrically connected to the fuel cell in such fashion that they operate only when electric current is demanded (by the external load); preferably these electrical connections (indicated as 69, 71) are of a well known current-monitoring type, to drive the electric motors of the blower and pump at a speed generally proportional to the current delivered by the battery to the load. When substantially undiluted oxygen (which may be supplied from a storage tank 72 under pressure) is used in place of air the control valve 73 for the supply of oxygen may be similarly regulated in response to the electrical demand on the battery (the blower 46 being disconnected or removed).

The pre-humidification of the reactant air (or oxygen) minimizes the danger of undesirable dehydration of the electrodes even when the rate of flow of these reactants is too high.

In making the fuel cell electrodes, one may use the constructions described in Unclassified Document AD 611 558—"A New High Performance Fuel Cell Employing Conducting-Porous-Teflon Electrodes (Niedrach-Alford) and Liquid Electrolytes" by L. W. Niedrach and H. R. Alford, published by and available from Clearinghouse for Federal Scientific and Technical Information, U.S. Department of Commerce, which describes catalyst mixtures, conductive screens and hydrophobic films, which may be employed. As previously mentioned, the preferred form of my invention uses also an electrolyte-permeable layer 64 (which is not described in the Niedrach et al. publication). This may be made of a material which is readily wetted by the electrolyte but resistant to attack thereby, having pores of such size that the electrolyte in the pores blocks the passage of bubbles of the gas. For example, a film of polyvinyl chloride about 5 to 10 mils thick and having a pore size of about 6–7 microns may be employed; it may be adhered to the face of the electrode (opposite to the face carrying the hydrophobic film) by sparying that electrode face with an adhesive (such as a toluene solution of rubber), then placing the film) by spraying that electrode face with an adhesive at 325° F.) and pressure. The amount of adhesive used for this bonding should of course be as small as possible, so that it does not unduly block the pores of the hydrophilic film. Generally some blockage of the pores does occur during bonding, due to the presence of the adhesive and also as a result of flow of the film material under the high pressures which may be used in the bonding step; for best results one may compensate for this by choosing a film having an appropriate pore size (determined by preliminary tests of the adhesive-bonded structures, using films of various pore sizes) such that the film after bonding is receptive to, and freely permeable by, the aqueous medium and, when wet with said medium, has a "bubble pressure" higher than the expected peak hydrogen pressure to which it will be subjected during operation of the fuel cell. The same types of hydrophilic and hydrophobic layers may be employed in the barriers 37 of the heat exchanger.

The presence of the hydrophilic layer 64 which serves as a bubble barrier (having, for example, a hydrogen bubble pressure of 3 to 5 p.s.i.) gives the electrode structure the ability to operate with assurance over a wide range of hydrogen pressures without the need for extensive external controls; this is particularly desirable in the illustrated construction in which the pressure of hydrogen from the generator may vary considerably, as previously described. The system is thus in effect auto-balancing, since it accommodates itself to the conditions created by the electrical demand on the fuel cell, the ambient temperature and the previous history of the system, without using expensive, heavy, external controls. The two membranes, on the opposite sides of the catalyst bed, maintain the electrolyte and reactant gases in their proper relationship to each other automatically owing to the intrinsic surface energies of the membranes. Films having interconnecting pores suitable for use as hydrophilic bubble barriers may be manufactured by well-known techniques (e.g. by forming the film by evaporating the solvent from a solution of a high polymer in the presence of a solvent-miscible non-solvent, such techniques and films being described in U.S. Pat. 2,944,017 of July 5, 1960 and the references mentioned therein) and are also available commercially. Generally it is preferred to use a material whose pores occupy at least 50%, preferably at least 60% of the total volume of the film. One commercial material is Millipore Corporation's Polyvic Type BC, a flexible polyvinyl chloride film about 9 mils thick having a pore size of about 6 microns. Another hydrophilic material is porous polyvinylidene fluoride film. Although the polyvinylidene fluoride in bulk form is itself not a hydrophilic material, when it is in suitable porous film form, however, its structure is such that the aqueous medium is sucked into and held within the pores by capillary action and the film thus carrying the aqueous medium is resistant to the passage of gas bubbles through its pores.

The distances between the electrodes 53, 54 on opposite sides of each electrolyte chamber are preferably small, preferably less than 0.1 inch, e.g. on the order of 0.05 inch or less. Smaller distances desirably decrease the electrical resistance of the electrolyte chambers.

Catalyst beds for use in the electrodes are well known in the art (see, for example, the cited Niedrach et al. publication and the Christopher article in "Proceedings 20th Annual Power Sources Conference," pp. 18–21). Thus, they may be composed of a mixture of fine particles of an electrocatalyst such as platinum black or other electrocatalytic metal (e.g. palladium, silver, nickel), which may be supported on a carrier (e.g. platinum on a carbon carrier), and fine particles of a hydrophobic material resistant to the electrolyte, such as polytetrafluorethylene; typically the electrocatalyst is made up of agglomerates of particles on the order of 0.01 micron in diameter and the polytetrafluoroethylene particles are less than 1 micron (e.g. 0.2–0.5 micron) in diameter. The use of the hydrophobic particles in admixture with the electrocatalyst yields a bed structure which is permeable to both the gas and the aqueous electrolyte; in this structure the liquid gas meniscus reverses its direction between a hydrophilic electrocatalyst surface and a hydrophobic polytetrafluorethylene surface spaced from, but very near, said electrocatalyst surface.

The electrocatalyst bed may be formed in known manner from a suspension of fine particles of previously formed electrocatalyst (e.g. platinum black) and fine particles of the hydrophobic polymer in water or other suspending medium for the bed-forming material; the electrocatalyst may, if desired, be deposited onto the surfaces of fine carbon particles (e.g. platinum on carbon) which particles are then added to said suspending medium; also, the electrocatalyst may be deposited (as by chemical reduction) onto the surfaces of particles of hydrophobic polymer which may themselves be in the suspended condition. The relative proportions of electrocatalyst and polymeric material may be, for example, within the range of about 9:1 to 1:1, preferably about 2:1 to 4:1. The thickness of the deposited bed and of the current collector screen may be, for example, within the range of about 0.001 to 0.1 inch.

Mixtures of hydrophobic polymer and electrocatalyst are also described in the book "Fuel Cell Systems, Advances in Chemistry Series, 47" published 1965 American Chemical Society, pages 106–115. Teflon dispersion polymers and aqueous dispersions of polytetrafluoroethylene are described in Kirk-Othmer Encyclopedia of Chemical Technology (2nd ed.), vol. 9, pages 813–817.

The porosity of the catalyst bed may be increased by incorporating fine particles of a solid extractable filler in the aqueous suspension of catalyst (e.g. about 5–70% of particles of aluminum of about 0.1–10 micron diameter); this filler may be subsequently removed, as by leaching with aqueous KOH. The suspension of bed-forming particles may be a relatively stable one (e.g. one which takes about 1 to 10 days to settle) or relatively unstable (settling after, e.g., 15 minutes of standing at room temperature).

The hydrophobic film component of the electrode should be as thin as practical with as small a pore size and as great a total porosity as possible. A membrane having an approximate average pore size of about 2 microns, a porosity of about 65% and a thickness of about 3 to 5 mils (i.e. 0.003–0.005) has given very good results. The specific hydrophobic films described in the previously cited references may be used, as may be the film known as Mitex filter sheet material (sold by Millipore Corporation), comprising a continuous mat of Teflon (TFE) fibers which are fused together at each fiber intersection to prevent structural distortion.

The preferred electrodes are extremely light in weight (e.g. their weight may be less than about 30 grams per square foot) and they function to supply a high surface area reaction zone. The efficiency of fuel utilization and the electrical capacity of the system are largely independent of discharge rate. For example, the difference between the polarizations at the hydrogen electrode at discharge rates of 100 amps./ft.$^2$ and 500 amps./ft.$^2$ is often as small as 50 mv., or 5% of the voltage per cell.

The voltage generated between each pair of electrodes, in the preferred system, is about 0.7–0.8 (depending on the discharge rate). As is conventional in the fuel cell and battery arts, the large number of individual pairs of electrodes in the fuel cell may be electrically interconnected in various series and parallel arrangements to attain the desired voltage and current-delivering capacity at the output terminals of the fuel cell.

As indicated by the equation set forth above, the preferred hydrogen-generating units consume about 22 moles of water to produce 21 moles of hydrogen gas. Some additional water is also supplied by the reaction of the carbon dioxide of the air with the electrolyte. The presence of the aqueous KOH in the reservoir 19 aids in maintaining the water balance, and its water content compensates for any overall loss of water. Thus, unlike conventional fuel cell systems in which there must be close control and removal of water by special mechanisms, my system can be operated using a simple addition of water at a predetermined location.

The aqueous solution of KOH preferably has a concentration of about 30–35%, although more dilute solutions (e.g. 15%) or more concentrated solutions (e.g. 45%) or even substantially saturated solutions may be employed. Other bases may be used, less preferably, e.g., NaOH or LiOH.

In the heat exchanger, the hydrophilic and hydrophobic porous layers 38, 39 may be composed of films of the same materials as are used in forming the electrode structures. They may be suitably supported in any desired manner; for example, they may be bonded to opposite sides of a thin wire mesh supporting screen, e.g., a nickel woven wire screen about 5 mils thick, so that there is a small space between the two films; or they may be bonded in face-to-face contact.

It will be appreciated that instead of using the electrolyte to scrub the $CO_2$ from the air in the heat exchanger, the removal of $CO_2$ may be affected in a separate scrubber, which may be of well known type (e.g. of the thermally rechargeable type or the lithium hydroxide type) and through which the air may be passed, for example prior to its entry into the heat exchanger.

The hydrogen-producing units may be produced by conventional techniques of powder metallurgy or ceramic production, e.g. by forming a mixture of the Al and Si powders in a mold at a temperature, and pressure, sufficient to sinter the particles together to form a porous rod. In another method the Al and Si powders are mixed with a material which imparts plastic extrudability to the mixture (e.g. a wax or resin, such as polystyrene) and the resulting plastic mixture is continuously extruded to form a continuous rod; then all or part of the added material is removed, as by heating the rod to evaporate off or decompose the added material while sintering the remaining particles together, or by treating the rod with a solvent for all or part of the added material. Alternatively the powder mixture may be contained in a porous container; for example a mixture of particles, of size small enough to pass a 100 mesh (U.S. Standard) screen, may be tamped into a porous tube of polymethylmethacrylate plastic and used as a hydrogen-producing unit. (Incidentally, the reaction with the electrolyte will cause such particles to adhere together forming a unitary spent rod which can be removed readily from its porous container.) Other materials may be present in the Si-Al hydrogen-producing units, e.g. promoters such as described, or other substances which may serve to bind the particles together or control the porosity of the rods (e.g. organic polymers).

The mixture of silicon and aluminum, which are each in the reduced state, may be present in the form of an alloy, or in the form of an intermetallic compound or a so-called silicide. It may include other metals capable of reacting with water, under the same conditions, to liberate hydrogen from the water (e.g. 5-30% of sodium, potassium, lithium, calcium, etc.); the added metal (e.g. potassium) will also supply a constituent of the insoluble reaction product and thereby reduce or eliminate the previously described loss of potassium from the electrolyte. For example, a powdered alloy of the aluminum, the silicon and the potassium may be shaped into desired porous rods; or the rods may be made of a mixture of a powdered alloy of the aluminum and the potassium, with powdered silicon (or ferrosilicon); or the rods may be formed from a mixture of a powdered alloy or compound of the silicon and the potassium, with powdered aluminum, etc.

If desired, there may be a vertically non-uniform arrangement of the hydrogen-producing units. Thus the porosity or density of the units or the particle size of the powders making up the units may vary along their lengths; for example, smaller particles may be used for the bottom portions than for the tops of the units.

It is also within the broader scope of the invention to employ the aluminum or silicon alone. In this case, the resulting soluble reaction products will contaminate the electrolyte, and have some adverse effect on the fuel cell reaction, but this effect can be tolerated especially when the cell is used in situations where only a short term supply of power is needed. Also, it is within the broader scope of the invention to use the aluminum and silicon, alone or together, to generate the hydrogen in a system in which there is no direct communication between the electrolyte in the fuel cell and the aqueous alkaline solution reacting with these elements. For example, with fuel cells of known type in whose operation the water of the fuel cell reaction does not mix substantially with the electrolyte but runs down the gas side of the electrodes and is separately collected, the collected water may be supplied to the hydrogen generator (being gravity-fed, for example, through the same inlet as is used in the illustrated embodiment for the feed of the water-rich electrolyte from the fuel cell and heat exchanger), and the resulting hydrogen may be supplied from the generator to the fuel cell in the same pulsating manner as previously described. In such a system the aqueous material in contact with the aluminum need not be alkaline; for example, it may be a solution of a mercuric salt (e.g. mercuric chloride, in about 1% concentration). In its still broader, but less desirable aspects, my invention can employ highly reactive light elements, such as alkali metals or alkaline earth metals, as the water-reactive hydrogen-producing elements, alone or in combination with each other or with the aluminum or silicon.

The illustrated embodiment of the invention may also be operated under conditions in which a portion of the water of reaction condenses in the gas spaces of the fuel cell. A line may be provided for transporting this collected water to the hydrogen generator, particularly when the hydrogen-producing reaction is (like the $$Si+Al+KOH+H_2O$$

reaction using equiatomic amounts of Si and Al) one which consumes slightly more water than is generated by the fuel cell. Makeup water is also provided by the KOH storage reservoir shown in the drawings, as previously mentioned.

The exothermic heat resulting from the hydrogen-generating reaction often heats the hydrogen to a temperature approaching, or exceeding, the usual operating temperature of the fuel cell. The heated hydrogen may, if desired, be passed, on its way to the fuel cell, through a heat exchanger where part of its heat is used to preheat the reactant air prior to the entry of the latter into the electrolyte heat exchanger previously described.

The hydrogen generator, heat exchanger and fuel cell may be constructed as separate modules, which can be assembled into a unitized battery package in such a manner that any one of the modules can be readily replaced. Thus the conduits joining the modules can each have suitable intermediate couplings, of known construction, with a shut-off valve in each conduit adjacent its coupling, so that any module can be operatively isolated from the others by closing the appropriate shut-off valves and then decoupled, after which the module thus isolated can be removed and an identical replacement module coupled into the system in its place.

As illustrated in FIG. 1 of the drawing, the conduits 90 and 91 serve for the passage of circulating electrolyte between the heat exchanger 13 and the fuel cell 12, the circulation being effected by means of the pump 47. The conduit 92 serves for the air fed (from blower 46) to the heat exchanger 13. The conduit 93 serves for the passage of air from the heat exchanger to the fuel cell (or, when desired, for the passage of oxygen from tank 72 to the fuel cell). The conduit 94 serves for the passage of hydrogen from the outlet 17 of generator 11 to the fuel cell. The conduit 96 serves for the passage of electrolyte from the heat exchanger to the electrolyte opening 16 of the hydrogen generator 11; as previously indicated the hydrogen generator constitutes a sort of bay with respect to the electrolyte in the fuel cell 12 and heat exchanger 13 so that the passage 16 serves not only as an inlet through which the water-diluted electrolyte (carrying water picked up by it in the fuel cell) enters the hydrogen generator 11, but also as an outlet for the passage of the eelctrolyte of lower water content out of the hydrogen generator, there being little or no current of liquid in the passage 16 and conduit 96; much of the transport of material occurs by diffusion, with the KOH diffusing (owing to the concentration gradient) out of the hydrogen generator 11. Also, as previously indicated it is within the scope of the invention to provide means for positively circulating the electrolyte into and out of the hydrogen generator, and it is to be noted that the two principal units of the battery are the hydrogen generator and fuel cell, although for many purposes (particularly when the fuel cell is to be run at high rates) the battery does include the heat exchanger as a third principal unit.

As mentioned previously, FIG. 4 is a plan view of a fuel cell mainly in cross-section, while FIG. 6 is a plan view of a portion of a fuel cell illustrating a manifold arrangement. More specification FIG. 6 shows a hydrogen inlet manifold 98 (which is an extension of hydrogen feed conduit 94) having individual hydrogen feed pipes 99 connected to the individual hydrogen chambers 52; a hydrogen outlet manifold 101 having individual exit pipes 102 connected to other portions of said chambers 52; an electrolyte inlet manifold 104 having individual electrolyte feed pipes 106 connected to the individual electrolyte chambers 49; an electrolyte outlet manifold 107 having individual electrolyte exit pipes 108 connected to other portions of said chambers 49; an air inlet manifold 109 (which is an extension of air feed conduit 93) having individual air inlet pipes 111 connected to the individual air chambers 51; and an air outlet manifold 112 (leading to air vent 66) having individual air outlet pipes 113 connected to other portions of said chambers 51. It will be understood that the electrolyte inlet manifold 104 receives cooled electrolyte from the heat exchanger 13 through conduit 90 under the pressure provided by pump 47 while the electrolyte outlet manifold 107 discharges hot electrolyte to the heat exchanger through conduit 91.

In continuous operation the fuel cell temperature is preferably in the neighborhood of 150 to 200° F. The temperature in the hydrogen generator may, for example, be up to about 200° F.

Although the present invention has been described with reference to particular embodiments and examples, it will be apparent to those skilled in the art that variations and modifications can be substituted therefor without departing from the principles and true spirit of the invention.

What is claimed is:

1. An electric battery system comprising a fuel cell supplied with hydrogen gas and an oxidant and having a liquid body of aqueous liquid electrolyte, in which fuel cell said hydrogen and oxidant are reacted to produce electricity and water of reaction, a hydrogen generator for supplying hydrogen to said fuel cell, said hydrogen generator containing a reactive material which yields hydrogen gas in a water-consuming reaction, and means providing a liquid connection between said liquid body in said fuel cell and said hydrogen generator for withdrawing liquid water from said fuel cell and supplying water to said hydrogen generator said liquid body in said fuel cell being in a space bounded by electrode means and said liquid connection including liquid transfer means for the withdrawal of aqueous liquid from said body, said liquid transfer means being connected on the liquid body side of said electrode means to said space.

2. Battery system as in claim 1 in which said hydrogen generator contains an aqueous medium which reacts with said reactive material in said water-consuming reaction, said aqueous medium receiving water from said fuel cell through said connection.

3. Battery system as in claim 2 in which said reactive material is substantially inert to pure water at 25° C.

4. Battery system as in claim 2 in which the hydrogen-producing reaction between said reactive material and said aqueous medium yields a solid product insoluble in said medium.

5. Battery system as in claim 1 in which said reactive material comprises silicon or aluminum, in the reduced state.

6. Battery system as in claim 3 in which the fuel cell has spaced electrodes having a liquid aqueous electrolyte in the space between the electrodes, said connection serving for the flow of liquid electrolyte between said space and said aqueous medium in said hydrogen generator.

7. Battery system as in claim 6 in which said reactive material comprises silicon or aluminum in the reduced state and said electrolyte and said aqueous medium comprise an aqueous solution of a base.

8. Battery system as in claim 7 in which said reactive material is a mixture of silicon and aluminum present in proportion to produce, on reaction with said aqueous medium, an aluminum silicate insoluble in said medium.

9. Battery system as in claim 8 in which said silicon and aluminum are present in substantially equiatomic proportions.

10. Battery system as in claim 8 in which said mixture of silicon and aluminum is present as a number of separate, spaced liquid-permeable porous units.

11. Battery system as in claim 8 in which said reactive material comprises said silicon and aluminum together with the metal of said base in the reduced state, said metal being reactive with water to yield said base.

12. Battery system as in claim 6, having transport means for removing electrolyte, diluted with said water of reaction, from the space between the electrodes during the operation of said fuel cell, and means for removing heat from said removed diluted electrolyte, said transport means including means for returning cooled electrolyte to said space while maintaining said electrodes continuously wet with the liquid electrolyte.

13. Battery system as in claim 6 in which said oxidant is fed as a gas to said fuel cell, said battery having transport means for removing electrolyte, diluted with said water of reaction, from the space between the electrodes during the operation of said fuel cell, and for bringing said removed electrolyte into evaporative contact with oxidant gas being fed to said fuel cell whereby to humidify said oxidant gas.

14. Battery system as in claim 13 in which the oxidant gas is air and the electrolyte is an aqueous alkaline solution reactive with $CO_2$ in the air whereby to reduce the $CO_2$ content of the air before bringing the air into oxidative contact with an electrode of said fuel cell.

15. Battery system as in claim 13 in which said electrolyte and said oxidant gas are in said evaporative contact at a porous solid bubble barrier having small openings which are wet by and permeable to said electrolyte but impermeable to bubbles of said oxidant gas under the prevailing pressures.

16. An electric battery system comprising an electricity-producing fuel cell supplied with hydrogen gas and an oxidant, and a hydrogen generator for supplying hydrogen to said fuel cell, said generator being adapted to receive a liquid medium having a zone accessible to said liquid medium and containing a solid material reactive with said medium to produce hydrogen gas, a direct connection between the generator and the fuel cell whereby when the generator produces hydrogen at a rate faster than the rate of utilization thereof in the fuel cell the hydrogen pressure in said zone increases and vice versa, means associated with said generator for receiving said liquid medium, the construction and arrangement being such that on said increase in hydrogen pressure said liquid medium is forced by said pressure progressively from said zone whereby the area of contact between said solid and said medium in said zone decreases thereby decreasing the rate of hydrogen generation in said zone, and on decrease of the hydrogen pressure said liquid medium returns progressively to said zone thereby increasing the rate of hydrogen generation in said zone.

17. A battery system as in claim 16 in which said generator has a hydrogen outlet connected to said fuel cell, and a porous solid gas-permeable barrier between said hydrogen-producing zone and said outlet, the gas-permeable openings of said barrier having surfaces of material which is repellent to said liquid medium, said openings being sufficiently small that said surface repellancy prevents passage of said liquid medium through said barrier.

18. A battery system as in claim 16 in which said generator has a porous bubble barrier between said zone and said medium-receiving means, said bubble barrier being permeable to said liquid medium, the liquid-permeable openings of said bubble barrier being wet by said medium and being sufficiently small that when so wet they resist the passage of the hydrogen gas therethrough.

19. A battery system as in claim 17 in which said liquid medium is an aqueous solution of a base, said surfaces of said gas-permeable barrier being hydrophobic, said generator having a porous hydrophilic bubble barrier between said zone and said medium-receiving means, said hydrophilic barrier having liquid-permeable openings wet by said medium, and liquid-permeable openings being sufficiently small that when so wet they resist the passage of the hydrogen gas therethrough.

20. Battery system as in claim 16, said fuel cell having a hydrogen-containing zone, an oxygen-containing zone, an electrolyte-containing zone, and electrodes separating said electrolyte-containing zone from said hydrogen-containing zone on one side of the electrolyte-containing zone and from said oxygen-containing zone on the other side, the electrode at said hydrogen-containing zone comprising a hydrogen-permeable, electrolyte-permeable bed of electrocatalyst and current-conducting screen, a porous hydrophobic gas-permeable film on the hydrogen side of said bed and screen, and a porous hydrophilic electrolyte-permeable bubble barrier on the electrolyte side of said bed and screen.

21. A fuel cell having an electrode, an electrolyte zone on one side of said electrode, a liquid aqueous alkaline electrolyte in said zone, and an air zone on the opposite side of said electrode, said air acting as an oxidant in the operation of said fuel cell, wherein the improvement in combination therewith, comprising transport means for removing electrolyte from said electrolyte zone during the operation of said cell, a heat exchanger for removing heat from said removed electrolyte, said transport means including means for returning cooled electrolyte to said electrolyte zone while maintaining said electrodes continuously wet with the electrolyte, means for passing said oxidant air through said heat exchanger prior to entry of said air into air zone and for bringing said air during such passage into reactive contact with said electrolyte whereby to reduce the $CO_2$ content of said air by reaction of the $CO_2$ with the aqueous alkaline electrolyte solution before bringing the air into said air zone said reactive contact being effected at a porous barrier having small openings which are wet by and permeable to said electrolyte but impermeable to bubbles of the air under the prevailing pressure.

22. Process for generating electricity comprising reacting hydrogen and an oxidant in a fuel cell having a liquid body of liquid aqueous electrolyte to produce electricity and water of reaction, generating hydrogen gas in a zone where water is reacted with a material which reacts with water to yield hydrogen gas, supplying said hydrogen gas from said zone to said fuel cell, withdrawing liquid water from said liquid body of said fuel cell during the operation thereof, and supplying withdrawn liquid water to said zone.

References Cited

UNITED STATES PATENTS

| | | | |
|---|---|---|---|
| 909,536 | 1/1909 | Brindley | 23—211 UX |
| 2,721,789 | 10/1955 | Gill | 48—61 X |
| 3,133,837 | 5/1964 | Eidensohn | 136—86 |
| 3,174,833 | 3/1965 | Blackmer | 48—61 X |
| 3,179,500 | 4/1965 | Bowen et al. | 136—86 UX |
| 3,276,909 | 10/1966 | Moos | 136—86 |
| 3,371,468 | 3/1968 | Shropshire | 55—158 |
| 3,432,357 | 3/1969 | Dankese | 136—86 |

FOREIGN PATENTS

| | | | |
|---|---|---|---|
| 1,463,299 | 11/1966 | France | 136—86 |

WINSTON A. DOUGLAS, Primary Examiner

M. J. ANDREWS, Assistant Examiner